(12) United States Patent
Gebhart et al.

(10) Patent No.: US 7,606,802 B2
(45) Date of Patent: Oct. 20, 2009

(54) PRESERVING LOG FILES IN A DISTRIBUTED COMPUTING ENVIRONMENT

(75) Inventors: Alexander Gebhart, Bad Schoenborn (DE); Erol Bozak, Pforzheim (DE)

(73) Assignee: SAP AG, Walldorf (DE)

( * ) Notice: Subject to any disclaimer, the term of this patent is extended or adjusted under 35 U.S.C. 154(b) by 206 days.

(21) Appl. No.: 11/020,343

(22) Filed: Dec. 22, 2004

(65) Prior Publication Data

US 2006/0136360 A1 Jun. 22, 2006

(51) Int. Cl.
*G06F 7/00* (2006.01)
*G06F 17/00* (2006.01)
*G06F 17/30* (2006.01)

(52) U.S. Cl. ..................... 707/10; 707/103 X
(58) Field of Classification Search ................ None
See application file for complete search history.

(56) References Cited

U.S. PATENT DOCUMENTS

| 6,298,457 | B1 * | 10/2001 | Rachlin et al. ............ 714/49 |
| 6,725,261 | B1 * | 4/2004 | Novaes et al. ............ 709/220 |
| 2002/0083115 | A1 * | 6/2002 | Kinder et al. ............ 709/101 |
| 2003/0212654 | A1 * | 11/2003 | Harper et al. ............ 707/1 |
| 2006/0031267 | A1 * | 2/2006 | Lim et al. ............ 707/202 |

OTHER PUBLICATIONS

Borr, "Robustness to Crash in a Distributed Database: A Non Shared-Memory Multi-Processor Approach", Technichal Report 84.2, Sep. 1984, Tandem Computers.*

* cited by examiner

*Primary Examiner*—Neveen Abel Jalil
*Assistant Examiner*—Michael J Hicks
(74) *Attorney, Agent, or Firm*—Finnegan, Henderson, Farabow, Garrett & Dunner LLP

(57) ABSTRACT

A system includes a first device that runs an archiving master program. The first device includes available storage for use by the archiving master program. A second device runs a computer program that generates log files for storage on the second device. The second device runs an archiving slave program. The archiving slave program sends the log files to the archiving master program. The archiving master program receives the log files from the archiving slave program and stores the log files in the available storage.

17 Claims, 2 Drawing Sheets

PRESERVING LOG FILES IN A DISTRIBUTED COMPUTING ENVIRONMENT

TECHNICAL FIELD

This patent application relates generally to processing by a digital computer and, more particularly, to preserving log files in a distributed computing environment.

BACKGROUND

In many data centers today, clusters of servers in a client-server network that run business applications often do a poor job of juggling unpredictable workloads. One server may sit idle, while another is constrained. This leads to a "catch-22" situation, in which companies, needing to avoid network bottlenecks and safeguard connectivity with customers, business partners and employees, often plan for high spikes in demand, then watch as those servers operate well under capacity most of the time.

Grid computing addresses some of the foregoing deficiencies in today's client-server networks. In grid computing, disparate computers and systems in an organization, or among organizations, are configured to operate as one large, integrated computing system. More specifically, grid computing is a form of distributed computing that harnesses unused processing cycles of all computers in a network to solve problems that are too complex for any one machine. Grid computing enables selection, aggregation, and sharing of information resources resident in multiple administrative domains and across geographic areas. The information resources are shared, for example, based upon their availability, capability, and cost, as well as a user's quality of service (QoS) requirements.

Applications running in a grid environment are typically dynamically deployed to available grid nodes (machines). After such applications have finished running, they are removed from the grid nodes. Removal, in this context, means that the application is completely deleted from a grid node. Remnants of the application, such as log files, are also deleted from grid nodes, since they consume resources, such as disk space. This can be a drawback, especially if the log files are needed at a later point in time.

SUMMARY

The present invention provides methods and apparatus, including computer program products, for preserving log files in a distributed computing environment.

In general, in one aspect, the invention is directed to a system that includes a first device that runs an archiving master program, where the first device includes available storage for use by the archiving master program. A second device runs a computer program that generates log files to store on the second device. The second device runs an archiving slave program, which sends the log files to the archiving master program. The archiving master program receives the log files from the archiving slave program and stores the log files in the available storage.

The foregoing aspect may also include one or more of the following. A third device may receive an instruction to execute the computer program. The third device may run a controller that instructs the second device to start the computer program in response to the instruction. The third device may send an identifier associated with the computer program to the second device. The archiving slave program may send the identifier to the archiving master program. The archiving slave program may store the identifier with the log files in the available storage.

The second device and the third device may be components of a distributed computing system. A repository in the distributed computing system may contain the computer program. Code may be retrieved for the computer program from the repository, and may be executed on the second device. The archiving slave program may generate at least one metafile that is associated with the log file and that contains information relating to the log file. The archiving slave program may send the at least one metafile to the archiving master program, and the archiving master program may store the at least one metafile with the log files in the available storage. The archiving slave program may send the log files to the first device in response to an indication relating to termination of the computer program.

In general, in another aspect, the invention is directed to a method for use in a distributed computing system that includes a network device that executes an archiving slave program. The archiving slave program performs the method to preserve a log file generated by a copy of a computer program on the network device. The method includes obtaining an identifier, receiving an indication that the copy of the computer program is terminated, and sending the identifier and the log file to an archiving master program after receipt of the indication that the copy of the computer program is terminated. This aspect may also include one or more of the following features.

The log file may be stored in a first storage area on the network device, and the method may further include saving the log file to a second storage area on the network device in response to the indication that the copy of the computer program is terminated. The log file may be retrieved from the second storage area to send to the archiving master program, and may be compressed before sending.

A metafile may be generated that contains metadata associated with the log file. The metafile may be sent to the archiving master program with the log file. The metadata may include the identifier and/or one or more of the following: a name of the computer program, a family of the computer program, a version or release of the computer program, a number of the log file, a file name of the log file, a path to an original location of the log file, a type of the log file, a network address of the network device, a host name of the network device, a request associated with the identifier, a response from a server associated with the archiving master program, and time information associated with the session.

Following termination of the copy of the computer program on the network device, a second network device may receive the identifier, run a second copy of the computer program that generates information for storage in a second log file on the second network device, receive an indication that the second copy of the computer program is terminated, and send the identifier and the second log file to the archiving master program for storage.

Data may be sent to the archiving master program that identifies the network device, and second data may be sent to the archiving master program that identifies the second device. The data may be associated with the log file and the second data may be associated with the second log file.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

The process described herein can be performed in any type of computer network network. In the example below, the process is described in the context of a grid network.

Figure 1:
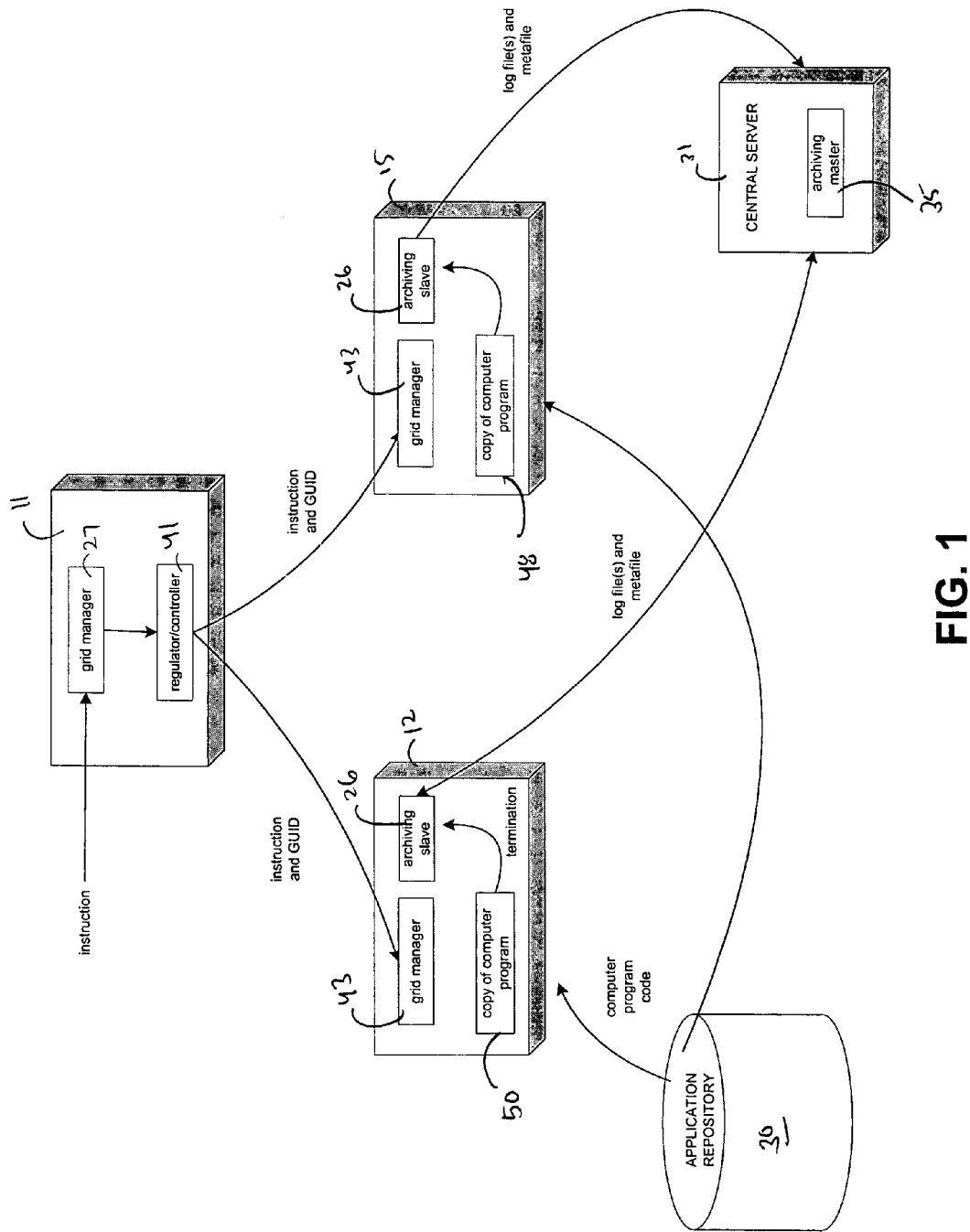
FIG. 1 is a block diagram of elements of an exemplary computer network.

As shown in FIG. 1, exemplary grid network includes three grid nodes: nodes 11, 12 and 15. When a computer program is run on a grid node, the computer program generates one or more log files, and stores those log files on the grid node. In this example, the grid nodes run software, namely an archiving slave 26, to preserve those log files. The operation of archiving slave 26 is described below in more detail in conjunction with FIG. 2.

The network of FIG. 1 also includes a central server 31 to store, among other things, log files from the grid nodes and metafiles (described below) associated with those log files. Central server 31 runs software, namely an archiving master 35. As described below, archiving master 35 receives log files and other information from an archiving slave program running on a grid node, and stores the log files and other information in available storage of central server 31. Archiving master 35 also provides grid nodes (or others devices) with access to stored log files upon request.

Elements of FIG. 1 not mentioned above are described below.

Figure 2:
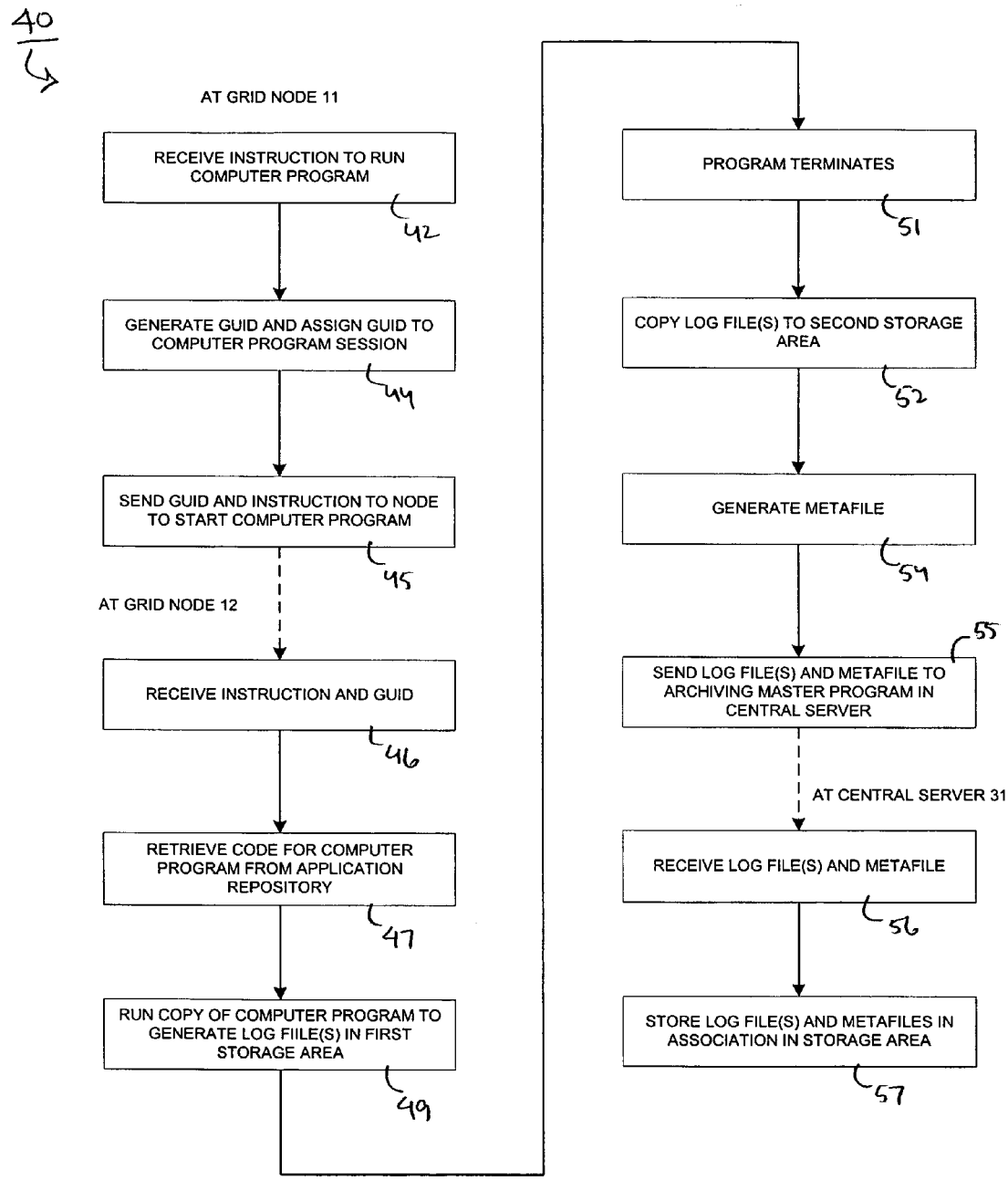
FIG. 2 is a flowchart showing a process for preserving log files that may be performed on the computer network.

FIG. 2 shows a process 40 for preserving log files generated on grid nodes. Process 40 is described in connection with grid nodes 11, 12 and 15; however, it is noted that process 40 can be implemented on any network node, or on any other (grid or non-grid) network that maintains log files on various devices.

In process 40, grid node 11 receives (42) an instruction to run a computer program. A grid manager 27 running on grid node 11 passes the instruction to regulator/controller 41. A grid manager is software for use in controlling operations of a grid node. Regulator/controller 41 contains software that is run on grid node 11 to start and stop programs, or portions of programs, on various inferior grid nodes. Regulator/controller 41 receives the instruction, and generates and assigns (44) a global unique identifier (GUID) for the computer program that is to be run. In this embodiment, the GUID is associated only with a current execution of the computer program. That is, if, at some point in the future, regulator/controller 41 is instructed to execute the same computer program again, regulator/controller 41 will assign a new GUID to that execution. Regulator/controller 41 sends (45) an instruction to grid node 12 to execute the computer program. Regulator/controller 41 sends the GUID to grid node 12 along with the instruction.

A grid manager 43 in grid node 12 receives (46) the instruction and GUID, retrieves (47) code for the computer program to be run from, e.g., an application repository 31, and runs (49) a copy 50 of that computer program on grid node 12. During execution, the computer program produces one or more log files, which may be stored, e.g., in a file system on grid node 12. The log files are typically stored in a designated area of storage, from which they are deleted following termination of copy 50.

The copy 50 of the computer program may terminate (51) for any reason. For example, regulator/controller 41 may terminate the copy, or the copy may terminate on its own. As described above, upon termination of the copy 50 of the computer program, grid manager 43 deletes the copy 50 of the computer program, and all remnants thereof (including log files), from grid node 12. In this case, however, before grid manager 43 can act, archiving slave 26 saves a copy of the log files to a different storage area on grid node 12. That is, archiving slave 26 receives an indication that the copy of the computer program on grid node 12 is terminated (either from the computer program itself or from a process associated with the computer program). In response, archiving slave 26 copies (52) the log files to a storage area that is not affected when grid manager 43 deletes the copy of the computer program and its remnants from grid node 12. Archiving slave 26 may copy the log file(s) to a special local directory first, before sending them to the archiving master. One advantage of this is that even if a network connection between the archiving slave and archiving master is broken, the log files can still be preserved. That is, they are stored in a safe place locally and, as soon as the network connection is up, the log files(s) can be sent to the archiving master, as described below.

Archiving slave 26 stores the GUID of the computer program in association with the log files. This is done in order to ensure that the log files can later be associated with the correct execution of a computer program. The GUID may, or may not, be stored in a metafile that is generated by archiving slave 26. In this regard, archiving slave 26 generates (54) a metafile that contains data associated with the log files. The metafile may be an XML file, and may be generated during and after execution of the computer program. Data in the metafile may include, but is not limited to, a name of the computer program, a family of the computer program, a version or release identifier of the computer program, a number (e.g., numerical identifier) assigned to the log file, a file name or names of the log file(s), a path to an original storage location of the log file, a type of the log file, a network address of grid node 12, a host name associated with grid node 12, a request associated with the GUID, communications (e.g., requests and responses) to/from a server associated central server 31, and times (e.g., start and stop times) during which the computer program was run on grid node 12. At least some of this information may be obtained, e.g., by communicating with the computer program during its execution.

Archiving slave 26 sends (55) the log files, associated metafiles, and GUID (if the GUID is separate from the metafile) to archiving master 35. The information may be compressed using the "zip" format and the resulting compressed file may be transferred to archiving master 35 using the file transfer protocol (FTP).

Archiving master 35 receives (56) the compressed file from archiving slave 26. Archiving master 35 may decompress the compressed file in order to obtain the log files, the metafile, and the GUID. Archiving master 35 stores (57) the log files in available storage on central server 31. The log files are stored in association with a corresponding metafile and GUID. This information may be used to retrieve the log files. By way of example, an administrator or the like may query archiving master 35 for log files resulting from execution of a particular computer program. In response, archiving master 35 may search stored metafiles for the name of that computer program. Resulting hits identify log files that were generated by the computer program during one of its executions. Other such searches may be conducted based on the contents of metafiles on central server 31.

In a distributed network, such as a grid network, a computer program may run on one node, halt execution on that node, and then execute on another node. For example, grid manager 27 on grid node 11 may instruct node 12 to execute a copy of the computer program, instruct node 12 to halt execution of the copy of the computer program, and then may instruct grid node 15 to execute a copy of the computer program. In cases such as this, after a program is terminated on grid node 12, process 40 is run on grid node 15. To summarize, regulator/controller 41 provides grid node 15 with the original GUID. Grid manager 43 receives the GUID, and runs a second copy of the computer program. This second copy of the computer program also generates information that is stored in log files on grid node 15. As was the case above, grid node 15 eventually receives an indication that the second copy is terminated, and sends the GUID, the log files, and any associated metafiles to archiving master 35 for storage.

As noted above, the GUID is assigned per execution, meaning that each execution of the computer program is assigned a new GUID. However, when execution of a computer program is transferred between grid nodes part-way, the same GUID is maintained for the computer program (since it is still the same execution). An administrator may identify log files from different grid nodes using the metafiles based, e.g., on the nodes' network addresses, times associated with program execution, or other relevant information.

Process 40 and its various modifications are not limited to use with the hardware and software described above; they may find applicability in any computing or processing environment and with any type of machine that is capable of running machine-readable instructions. All or part of process 40 can be implemented in digital electronic circuitry, or in computer hardware, firmware, software, or in combinations thereof.

All or part of process 40 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with process 40 can be performed by one or more programmable processors executing one or more computer programs to perform the functions of process 40. The method steps can also be performed by, and process 40 can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of process 40 can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of process 40, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with process 40 can be rearranged and/or one or more such steps can be omitted to achieve the same, or similar, results to those described herein. Process 40 may be fully automated, meaning that it operate without user intervention, or interactive, meaning that all or part of process 40 may include some user intervention.

In addition to storing log files generated by applications, process 40 may also stored log files generated by a wrapper service. A wrapper service is software that accompanies resources or other software for the purposes of improving convenience, compatibility, or security. These log files may be stored in the same manner as described above.

Elements of different embodiments described herein may be combined to form other embodiments not specifically set forth above. Other embodiments not specifically described herein are also within the scope of the following claims.

What is claimed is:

1. A system comprising:
   a first device that runs an archiving master program, the first device comprising available storage for use by the archiving master program;
   an application repository storing code corresponding to a computer program;
   a second device configured to:
      receive an instruction to execute the computer program;
      retrieve the code from the application repository, the application repository being separate from the second device;
      generate a first copy of the retrieved code;
      execute the first copy of the code, wherein an execution identifier is associated with the execution;
      generate a first log file corresponding to the execution;
      run a first archiving slave program to generate a metafile that is associated with the first log file, the metafile including metadata describing a file name and a type of the first log file, a path to an original location of the first log file, and at least one of a number of the first log file, a name of the computer program, a family of the computer program, a version or release of the computer program, a number of the first log file, a file name of the first log file, a path to an original location of the first log file, a type of the first log file, a network address of the first device, a host name of the first device, a request associated with the execution identifier, a response from a server associated with the archiving master program, and time information associated with the halted execution;
      halt execution of the first copy of code;
      send the execution identifier, the first log file, and the metafile to the archiving master program after halting the execution; and delete, after the sending, the first copy of code, the first log file, and the metafile from the second device; and a third device configured to:
receive an instruction and the execution identifier to continue the halted execution;
retrieve, in response to the instruction, the code from the application repository, the application repository being separate from the third device;
generate a second copy of the retrieved code to continue the halted execution;
generate a second log file corresponding to the continued execution;
run a second archiving slave program used to send the execution identifier and the second log file to the archiving master program when the continued execution is complete, wherein the same execution identifier is associated with the halted execution and the continued execution; and
delete the second copy of code and the second log file from the third device, when the second archiving slave program completes the sending.

2. The system of claim 1, further comprising:
a fourth device that receives an instruction to execute the computer program, the fourth device running a controller that instructs the second device to start the computer program in response to the instruction.

3. The system of claim 2, wherein the fourth device sends the execution identifier to the second device; and
wherein the archiving master program stores the execution identifier with the first and second log files in the available storage.

4. The system of claim 2, wherein the second device and the third device comprise components of a distributed computing system.

5. The system of claim 1, wherein the first archiving slave program sends the first log file to the first device in response to an indication relating to termination of the execution of the first copy of code of the computer program on the second device.

6. The system according to claim 1, wherein a subsequent execution of the computer program is identified by a subsequent execution identifier used to identify the subsequent execution of the computer program on both the second and third device, the subsequent execution identifier being different from the execution identifier.

7. The system according to claim 6, wherein the execution identifier and subsequent execution identifier are global unique identifiers (GUIDs).

8. The system of claim 1, wherein the first device is a first node in a grid computing system, the second device is a second node in the grid computing system, and the third device is a third node in the grid computing system.

9. system according to claim 1, wherein the first archiving slave program stores the first log file in a local directory in the second device before sending the first log file to the archiving master program.

10. system according to claim 9, wherein the second device establishes a connection with the archiving master program to send the first log file.

11. system according to claim 10, wherein the second device monitors the connection while sending the first log file to the archiving master program, and uses the first log file stored in the local directory to re-send the first log file to the archiving master program when the connection is disrupted during the sending.

12. computer program product tangibly embodied in a machine-readable storage device, which when executed on a distributed computing system causes the distributed computing system to perform a method to preserve log files, the method comprising:
storing, in an application repository, code corresponding to a computer program;
running, on a first device, an archiving master program;
receiving, on a second device, an instruction to execute the computer program;
retrieving the code from the application repository, the application repository being separate from the second device;
generating a first copy of the retrieved code;
executing, on the second device, the first copy of the code, wherein an execution identifier is associated with the execution;
generating a first log file corresponding to the execution;
running, on the second device, a first archiving slave program to generate a metafile that is associated with the first log file, the first log file including metadata describing a file name and a type of the first log file, a path to an original location of the first log file, and at least one of a number of the first log file, a name of the computer program, a family of the computer program, a version or release of the computer program, a number of the first log file, a file name of the first log file, a path to an original location of the first log file, a type of the first log file, a network address of the first device, a host name of the first device, a request associated with the execution identifier, a response from a server associated with the archiving master program, and time information associated with the halted execution;
halting execution of the first copy of code on the second device;
sending the execution identifier, the first log file, and the metafile to the archiving master program after halting the execution;
deleting, after the sending, the first copy of code, the first log file, and the metafile from the second device;
receiving, on a third device, an instruction and the execution identifier to continue the halted execution;
retrieving, in response to the instruction, the code from the application repository, the application repository being separate from the third device;
generating a second copy of the retrieved code to continue the halted execution by the third device;
generating a second log file corresponding to the continued execution;
running, on the third device, a second archiving slave program used to send the execution identifier and the second log file to the archiving master program when the continued execution is complete, wherein the same execution identifier is associated with the halted execution and the continued execution; and
deleting the second copy of code and the second log file from the third device, when the second archiving slave program completes the sending.

13. The computer program product of claim 12, wherein the metadata includes the execution identifier.

14. The computer program product of claim 12, further comprising instructions that cause the computing system to:
compress the first and second log files before sending the first and second log files to the archiving master program.

15. The computer program product of claim 12, further comprising instructions that cause the computing system to:

send data to the archiving master program that identifies the third device, the data being associated with the first log file.

16. method of preserving log files in a distributed computing system comprising:

storing, in an application repository, code corresponding to a computer program;

running, on a first device, an archiving master program;

receiving, on a second device, an instruction to execute the computer program;

retrieving the code from the application repository, the application repository being separate from the second device;

generating a first copy of the retrieved code;

executing, on the second device, the first copy of the code, wherein an execution identifier is associated with the execution;

generating a first log file corresponding to the execution;

running, on the second device, a first archiving slave program to generate a metafile that is associated with the first log file, the first log file including metadata describing a file name and a type of the first log file, a path to an original location of the first log file, and at least one of a number of the first log file, a name of the computer program, a family of the computer program, a version or release of the computer program, a number of the first log file, a file name of the first log file, a path to an original location of the first log file, a type of the first log file, a network address of the first device, a host name of the first device, a request associated with the execution identifier, a response from a server associated with the archiving master program, and time information associated with the halted execution;

halting execution of the first copy of code on the second device;

sending the execution identifier, the first log file, and the metafile to the archiving master program after halting the execution;

deleting, after the sending, the first copy of code, the first log file, and the metafile from the second device;

receiving, on a third device, an instruction and the execution identifier to continue the halted execution;

retrieving, in response to the instruction, the code from the application repository, the application repository being separate from the third device;

generating a second copy of the retrieved code to continue the halted execution by the third device;

generating a second log file corresponding to the continued execution;

running, on the third device, a second archiving slave program used to send the execution identifier and the second log file to the archiving master program when the continued execution is complete, wherein the same execution identifier is associated with the halted execution and the continued execution; and deleting the second copy of code and the second log file from the third device, when the second archiving slave program completes the sending.

17. The method of claim 16, wherein the metadata includes the execution identifier.

* * * * *

UNITED STATES PATENT AND TRADEMARK OFFICE
CERTIFICATE OF CORRECTION

PATENT NO.        : 7,606,802 B2
APPLICATION NO. : 11/020343
DATED             : October 20, 2009
INVENTOR(S)       : Gebhart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this

Twelfth Day of October, 2010

David J. Kappos
*Director of the United States Patent and Trademark Office*